3,212,850
PREPARATION OF ALKALI METAL PEROXIDES
Emmitt L. Klebba, Boulder City, Nev., assignor to American Potash & Chemical Corporation, Los Angeles, Calif., a corporation of Delaware
No Drawing. Filed Nov. 13, 1962, Ser. No. 237,388
4 Claims. (Cl. 23—184)

This invention relates, in general, to the preparation of alkali metal peroxides. More specifically, this invention relates to the production of alkali metal peroxides in an aqueous alcoholic medium by the reaction of alkali metal hydroxide and hydrogen peroxide.

Alkali metal peroxides enjoy wide utility in such divergent areas as bleaching preparations, breathing apparatus and rocket propulsion systems.

Heretofore, considerable difficulty has been encountered in manufacturing alkali metal peroxides in a safe, efficient manner. Further difficulty has been experienced in producing high purity alkali metal peroxides in an efficient process which provides for the recycle and reuse of unconsumed reagents.

The present invention overcomes these difficulties by carrying out the following procedure.

(A) A mixture containing solid phase alkali metal peroxide in an aqueous-alcoholic medium is produced by reacting alkali metal hydroxide and hydrogen peroxide in this medium. The presence of the alcohol causes the precipitation of the solid phase alkali metal peroxide.

(B) The mixture produced in Step A above is treated to separate the solid phase alkali metal peroxide from the aqueous-alcoholic liquid phase.

(C) The aqueous-alcoholic liquid phase is treated with anhydrous alkali metal carbonate whereby substantially all of the water, water soluble salts and soluble alkali values are removed from the alcohol. The thus reclaimed alcohol can be reused as desired for any purpose whatsoever. Preferably, the reclaimed alcohol will be returned to Step A and utilized in the preparation of more alkali metal peroxide. The alkali metal carbonates can be treated to remove impurities and the water of hydration and returned for reuse.

Step A can be performed in any one of a number of ways. For example, alkali metal hydroxide, can be dissolved in alcohol and treated with hydrogen peroxide to produce alkali metal peroxide and byproduct water. When following this procedure, alkali metal peroxide appears as a solid phase in the aqueous-alcoholic liquid soon after the reaction is commenced. Alternatively, an aqueous solution of alkali metal hydroxide can be treated with hydrogen peroxide to form alkali metal peroxide, which is then precipitated by adding it to alcohol.

The process of this invention obviates the necessity for the dangerous procedure of distilling alcohol and water away from the alkali metal peroxide. A further advantage of this process is that the products of pyrolysis which inevitably result from such a distillation procedure are avoided so that a very pure alkali metal peroxide is produced. Also, a minimum amount of alcohol is necessary to cause the formation of solid phase alkali metal peroxide. Since no distillation step is involved, it is unnecessary to provide additional alcohol such as would be required to accomplish a successful distillation step. Thus, advantageously this process provides for the recycle and reuse of the alcohol employed therein without the complications of a distillation procedure and with a minimum total inventory of alcohol.

In the specification, claims and following specific examples, all parts and percentages are by weight unless otherwise indicated. The following examples are set forth to further illustrate and not to limit the invention.

*Example I.—Preparation of* $Li_2O_2$ 50 ml. of saturated aqueous lithium hydroxide (113 g. $LiOH \cdot H_2O$ in 500 ml. of soln.) is reacted with 15 ml. of a 30% aqueous hydrogen peroxide solution. The resulting mixture is cooled to 20° C. and poured with agitation and stirring into n-propyl alcohol (300 ml.). Agitation is continued for about 30 minutes. The hydrated solid precipitate, having the formula $$Li_2O_2 \cdot H_2O_2 \cdot 2H_2O$$

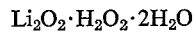

is filtered from the aqueous-alcohol and transferred to a vacuum dessicator (30–50 mm. Hg) and heated to between 90 and 95° C. for a period of 24 hours. The aqueous n-propyl alcohol filtrate is contacted with anhydrous potassium carbonate to dehydrate the alcohol and precipitate for reclamation any dissolved lithium salts as lithium carbonate. The thusly dehydrated alcohol is recycled to the process system.

*Example II.—Preparation of* $Na_2O_2$ 50 ml. of saturated aqueous sodium hydroxide is reacted with 15 ml. of 50% aqueous hydrogen peroxide solution. The resulting mixture is cooled to 15° C. and poured with agitation into isopropyl alcohol (350 ml.). Agitation is continued for about 25 minutes. The hydrated solid sodium peroxide precipitate is separated from the aqueous-alcoholic phase by centrifuging. The solid residue is transferred to a vacuum dessicator (30–50 mm. Hg) and heated to between 85–90° C. for a period of 20 hours. The aqueous isopropyl alcohol filtrate is contacted with anhydrous sodium carbonate for about 30 minutes to dehydrate the alcohol.

*Example III.—Preparation of* $K_2O_2$ 100 ml. of saturated aqueous potassium hydroxide is reacted with 45 ml. of 20% aqueous hydrogen peroxide solution. The resulting mixture is cooled to 20° C. and poured with constant stirring into isobutyl alcohol (500 ml.). Stirring is continued for about 50 minutes. The solid precipitate of potassium peroxide is filtered from the aqueous-alcohol liquid phase and transferred to a vacuum dessicator (30–50 mm. Hg) and heated to between about 90–95° C. for a period of 26 hours. The aqueous-alcohol liquid phase is treated with anhydrous potassium carbonate to dehydrate the alcohol. The thusly dehydrated alcohol is recycled to the process system. The potassium carbonate is heated strongly to dehydrate it and returned to the system for reuse.

*Example IV.—Preparation of* $Li_2O_2$

The procedures of Example I are followed except that sodium carbonate is used in place of potassium carbonate and the solid precipitate of lithium peroxide is separated from the aqueous n-propyl alcohol liquid phase by decantation.

*Example V.—Preparation of* $Li_2O_2$

A saturated solution of lithium hydroxide in isopropyl alcohol is treated with 30% hydrogen peroxide. The admixture of these two liquids is accomplished with continual agitation. Soon after mixing is begun, lithium peroxide begins to appear as a solid phase in the liquid mixture. Agitation is continued for about one hour after admixture is complete. The solid phase lithium peroxide is filtered from the aqueous-alcohol liquid phase and transferred to a vacuum desiccator (30–50 mm. Hg) and heated to between 80 and 90° C. for a period of 35 hours. The aqueous-alcohol filtrate is treated with anhydrous potassium carbonate to dehydrate the alcohol and precipitate for reclamation trace amounts of dissolved lithium salts as lithium carbonate. Since the potassium ion is very insoluble in alcohol, it remains in the water and is thus removed with the potassium carbonate. The lithium carbonate is separated from the potassium carbonate by conventional techniques and returned to the system as lithium hydroxide. The potassium carbonate is dehydrated and returned for reuse in the system and the alcohol is also recycled to the system.

The preferred alkali metal carbonate is potassium carbonate. The potassium ion is very insoluble in alcohol and for that reason the alcohol phase does not pick up the potassium ion from the potassium carbonate. Thus, using potassium carbonate, the presence of extraneous potassium ions in the recycled alcohol is avoided.

The alkali metal carbonates when utilized according to this invention, rapidly extract large amounts of water from the aqueous-alcoholic phase by forming the hydrated salts of the alkali metal carbonates. In order to be effective in this invention, it is necessary for the alkali metal carbonates to form the corresponding hydrated carbonates. If the alkali metal carbonate does not form a hydrate, it will not pick up water rapidly enough or in large enough quantities to be effective in the process of this invention. In general, those alkali metal carbonates can be utilized in this invention which form hydrated alkali metal carbonates.

If the alkali metal peroxides and the alkali metal carbonates utilized in the process of this invention do not contain a common alkali metal ion, a mixture of alkali metal carbonates will be produced when the aqueous-alcoholic liquid phase is contacted with the anhydrous alkali metal carbonate. This mixture of hydrated alkali metal carbonates can be treated by conventional techniques to separate the carbonates from one another. Each can then be returned to its appropriate place in the process system.

The recycle of carbonate and alcohol produces a very efficient process which can be maintained with only the occasional addition of small amounts of make up to these non-reacting material.

It is highly desirable to remove soluble alkali metal values from the alcohol each time it is recycled to the system. This prevents the build up of alcohol soluble alkali metal salts such as chlorides, nitrates, sulfates and the like, the anions of which enter the system as impurities in the reagents. This removal is accomplished when the aqueous-alcoholic liquid phase is contacted with the anhydrous alkali metal carbonate. Since the alkali metal ions are generally more soluble in water than in alcohol, they tend to follow the water and thus stay with the alkali metal carbonate when it is separated from the alcohol. In the instance, for example, where lithium peroxide is being produced and an anhydrous potassium carbonate is being used to remove the water from the alcohol, substantially all of the dissolved lithium values appear as solid lithium carbonate and the potassium ions being very isoluble in alcohol remain with the water and are removed from contact with the alcohol along with the hydraded carbonates.

Alcohols which can be utilized in this invention include primary, secondary and tertiary aliphatic alcohols including for example n-propyl, isopropyl, amyl, isoamyl, butyl and ethyl alcohols and the like.

As will be understood by those skilled in the art, what has been described is the preferred embodiment of the invention. However, many modifications, changes and substitutions can be made therein without departing from the scope and the spirit of the following claims.

What is claimed is:
1. A process comprising
(A) reacting an alkali metal hydroxide and $H_2O_2$ in an aqueous medium to form a mixture containing alkali metal peroxide, adding sufficient alcohol to said mixture to convert said alkali metal peroxide to a solid in an aqueous-alcoholic liquid mixture,
(B) recovering said solid alkali metal peroxide from the liquid mixture,
(C) admixing alkali metal carbonate with the remaining liquid mixture in an amount sufficient to separate substantially all of the water and water-soluble salts from the alcohol in the form of a solid comprising the corresponding hydrated alkali metal carbonate, and
(D) returning said alcohol to said (A).

2. A process comprising
(A) reacting an alkali metal hydroxide within $H_2O_2$ in an aqueous-alcoholic medium to form a liquid mixture containing solid phase alkali metal peroxide,
(B) recovering said solid phase alkali metal peroxide from said liquid mixture,
(C) admixing the liquid mixture remaining with alkali metal carbonate in an amount sufficient to separate substantially all of the water and water-soluble salts therein from the alcohol portion in the form of a solid comprising the corresponding hydrated alkali metal carbonate, and
(D) returning said alcohol to said (A).

3. A process comprising
(A) reacting lithium hydroxide with $H_2O_2$ in an aqueous medium to form lithium peroxide, and providing sufficient propanol in said aqueous medium to produce a mixture containing solid phase lithium peroxide in an aqueous-propanol liquid phase,
(B) recovering the said solid phase lithium peroxide from said liquid phase,
(C) admixing the liquid phase with anyhdrous potassium carbonate in an amount sufficient to separate substantially all of the water and water-soluble salts from the propanol in the form of a solid comprising hydrated potassium carbonate, and
(D) returning said alcohol to said (A).

4. A process comprising
(A) reacting sodium hydroxide with $H_2O_2$ in an aqueous medium to form sodium peroxide and providing sufficient propanol in said aqueous medium to produce a mixture containing solid phase sodium peroxide in an aqueous-propanol liquid phase,
(B) receiving the said solid phase sodium peroxide from said liquid phase,
(C) admixing the liquid phase with anhydrous potassium carbonate in an amount sufficient to separate substantially all of the water and water-soluble salts from the propanol in the form of a solid comprising hydrated potassium carbonate, and
(D) returning said alcohol to said (A).

References Cited by the Examiner
UNITED STATES PATENTS
2,962,358   11/60   Strater _____ 23—184

FOREIGN PATENTS
1,059,419   6/59   Germany.

OTHER REFERENCES
Gregory, "Uses and Applications of Chemicals and Related Materials," 1939 Edition, page 530, Reinhold Publishing Corp., New York.

MAURICE A. BRINDISI, *Primary Examiner.*